US011887169B2

(12) United States Patent
Hansen et al.

(10) Patent No.: US 11,887,169 B2
(45) Date of Patent: Jan. 30, 2024

(54) FACILITATING FUNDRAISING CAMPAIGNS USING A COMPETITIVE ONLINE PLATFORM

(71) Applicant: Fund Duel, Inc., Prescott, AZ (US)

(72) Inventors: Linda Hansen, Prescott, AZ (US); Dana Hansen, Prescott, AZ (US); Jasmine Hansen Toomalatai, Prescott, AZ (US); Weston Cann, Los Angeles, CA (US)

(73) Assignee: Fund Duel, Inc., Prescott, AZ (US)

( * ) Notice: Subject to any disclaimer, the term of this patent is extended or adjusted under 35 U.S.C. 154(b) by 490 days.

(21) Appl. No.: 16/846,789

(22) Filed: Apr. 13, 2020

(65) Prior Publication Data

US 2021/0319480 A1  Oct. 14, 2021

(51) Int. Cl.
*G06Q 30/0279* (2023.01)
*G06F 9/451* (2018.01)
*G07F 17/32* (2006.01)
*G06F 3/0484* (2022.01)
*G06F 3/0481* (2022.01)

(52) U.S. Cl.
CPC ....... *G06Q 30/0279* (2013.01); *G06F 3/0481* (2013.01); *G06F 3/0484* (2013.01); *G06F 9/451* (2018.02); *G07F 17/323* (2013.01); *G07F 17/3237* (2013.01); *G07F 17/3255* (2013.01); *G07F 17/3274* (2013.01)

(58) Field of Classification Search
CPC ... G06Q 30/0279; G06F 9/451; G06F 3/0481; G06F 3/0484; G07F 17/323; G07F 17/3237; G07F 17/3255; G07F 17/3274
See application file for complete search history.

(56) References Cited

U.S. PATENT DOCUMENTS

| 4,295,831 A | * | 10/1981 | Matt | G09B 19/0053 434/118 |
| 2010/0268769 A1 | * | 10/2010 | Goranson | G06F 16/957 707/769 |
| 2017/0132673 A1 | * | 5/2017 | Skoog | G06Q 50/01 |
| 2019/0147505 A1 | * | 5/2019 | Blass | G06Q 20/10 705/36 R |

* cited by examiner

*Primary Examiner* — Werner G Garner
(74) *Attorney, Agent, or Firm* — Shook, Hardy & Bacon L.L.P.

(57) ABSTRACT

Embodiments of the present disclosure provide for facilitating fundraising through the use of user-generated electronic media on a competitive online platform. In various embodiments, a campaign is generated based on a user's request. Each campaign is associated with teams made of groups of users that each have values. A piece of electronic media from a user is received along with a commitment value and selection of a team to support. A user profile is generated based on the associated team, the piece of electronic media, and commitment value. Based on the commitment value, the values for the user profile, team, and campaign are modified. A leaderboard graphical user interface (GUI) associated with the selected team and generated in part on the modified campaign, team, and user profile values is provided for display.

10 Claims, 12 Drawing Sheets

FACILITATING FUNDRAISING CAMPAIGNS USING A COMPETITIVE ONLINE PLATFORM

BACKGROUND

Online donation platforms provide a robust and dynamic medium for users to interact with one another and support causes of their choice. Entities requesting funding can use online platforms to communicate unmet needs to users and raise large lump sums in response to specific events, such as a natural disaster or the start of a new project. Engaging users on a regular basis (versus crisis-driven) can be integral in the success of an organization attempting to raise funds. In essence, providing opportunities for users to continue to interact with the platform long after their donations have been submitted ensure organizations achieve fundraising goals in the long-term. As organizations, especially those with funding needs, seek to interact with users on a more frequent basis, generating and leveraging online content has become even more important.

Sharing user-generated content has also become increasingly popular in recent years. Not only are users generating more content, but users are also continually seeking opportunities to comment or provide input on electronic media generated by others. Photos, videos, audio, among many others, are but a few examples of content that users create and then discuss on online platforms. Likewise, such user-generated content is being used more and more to make statements about society at large. Beyond sharing user-created content for leisure, users wield the same content to support a variety of causes, whether it be civic, professional, political, or personal. The advent of personal computing technologies provides users with the ability to generate media, discuss others' content at a moment's notice, and impose social commentary using that same content.

SUMMARY

Embodiments of the present disclosure generally relate to facilitating fundraising through the use of user-generated electronic media on a competitive, "game-ified" platform. More specifically, embodiments describe systems, methods, and computer-readable media for creating, managing, and updating campaign, team, and user profile data to generate electronic media to raise funds, the success of which is reflected in leaderboards that encourage users to regularly engage with the platform.

In various embodiments, a user can employ a personal computing device to engage with the online platform. The personal computing device can provide interfacing for the user to input information to participate in the fundraising campaign. In some aspects, the user can designate the parameters to set up a fundraising campaign along with the teams associated with the campaign. In some embodiments, the user can employ the personal computing device to upload user-generated media in support of a team and the associated campaign. In some other embodiments, other users are able to employ personal computing devices to donate with respect to electronic media previously generated by another user. The funds raised by each campaign, team, or user, can be presented for display to the user as a leaderboard. In some embodiments, the entities on the leaderboard are sized and ordered according to the amount of funds raised and/or ranking. In further embodiments, the entities in the leaderboard may be randomly ordered to combat first-view bias. The leaderboard can be utilized to engage and encourage users to participate in the challenge or donate with respect to other generated electronic media. Likewise, the leaderboards, and rankings of entities therein, may be used to determine which users and teams receive rewards for the highest fundraising amounts achieved. Users can interact with the leaderboards through a graphical user interface, including by providing donations, and affect the rankings and/or size of users, teams, and campaigns.

Thus, in accordance with the various embodiments outlined herein, the described techniques can facilitate a means for electronically generating, providing, and amplifying a fundraising campaign on a competitive, "game-ified" platform using campaign, team, and user data, among other elements.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing figures, wherein.

DETAILED DESCRIPTION

Figure 1:
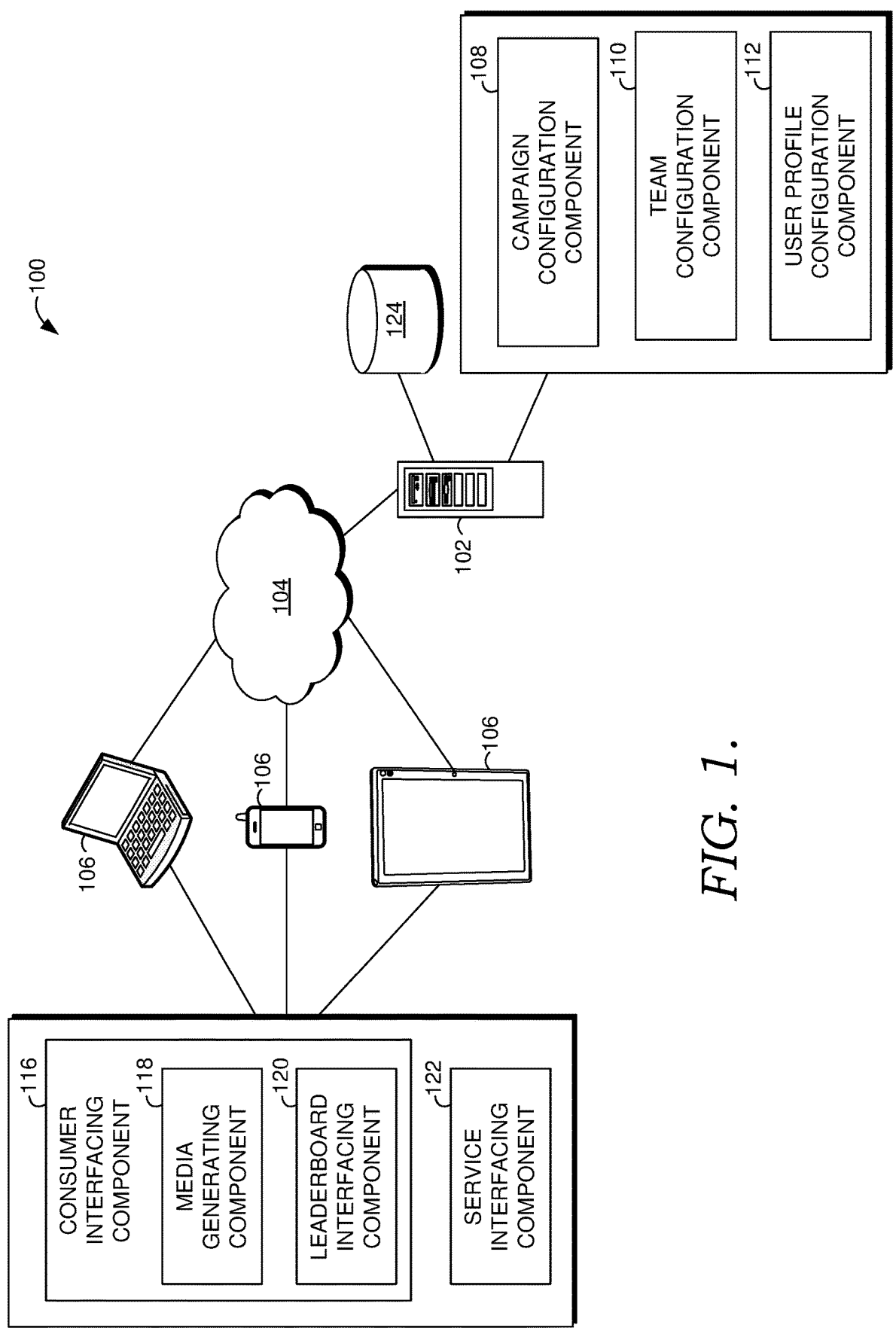
FIG. 1 is an exemplary system diagram in accordance with some embodiments of the present disclosure.

Embodiments described herein are broadly directed to facilitating an electronic transaction between a "consumer" (also referred to herein as "user") and an organization in the form of monetary donations. The embodiments enable a consumer to view a campaign with a list of associated teams, where each team is associated with users that have published electronic media. Challenges between teams in support of a campaign encourage users to provide electronic media in competition with electronic media generated by other users. A consumer can join the challenge in favor of a particular team by publishing their own electronic media and allowing others to donate in support of that piece of electronic media. Likewise, a consumer may donate in support of another user's electronic media or in support of a team in general. The funds raised by each user, team, and campaign is tracked and tallied for the length of the campaign. Based on these funds-raised values, campaigns, teams, and associated users are ranked and listed on leaderboards for users to view and select. Based on the rankings, the user(s) or team(s) that raise the most funds may receive pre-disclosed prizes. Any donation or contribution will affect the funds-raised values of the associated campaign, team, and user profile, and is reflected in rankings and, thus, on a leaderboard.

By way of a consumer interface, users can easily create and configure campaigns, teams, and their own user profiles. Users can provide the parameters for a campaign, including the fundraising goal, the length of the campaign, the teams competing, and any prizes for users that solicit the highest amount of donations, among others. Likewise, for each team, a user may set the parameters for the team name, description, among others. Any electronic media published in support of a team may also be generated by the user through a consumer interface. Moreover, the consumer interface can allow the user to provide payment information to facilitate the transfer of monetary donations.

Embodiments described herein provide consumers a way to regularly engage with organizations raising money for a cause through the publishing of user-generated electronic media. As previously described, organizations are more able to raise funds in response to a specific event, such as a natural disaster, but struggle with maintaining regular contact with users. Embodiments described in the provided disclosure enable consumers to engage with the organization constantly not only by publishing their own electronic media, but by also commenting or supporting electronic media generated by other users. Likewise, embodiments described herein provide organizations with the ability to promote competition (and thus raise funds) by redirecting users' interests to teams that may be under-performing. For instance, if a particular team is garnering the majority of interest, a leaderboard may instead present teams irrespective of their fundraising success in order to more evenly distribute users among the teams by diminishing the chances of first-view bias.

With the prevalence of social media platforms, retaining sustained engagement with users can also pose a challenge. In some embodiments herein, the online platform is "game-ified" by providing prizes to users that generate the most funds from a piece of electronic media. By incentivizing users to compete on teams and to compete individually by publishing electronic media, users remain engaged with the online platform and are likely to spread the word about the fundraising efforts on other social media platforms to attract more donations. Likewise, the focus on the user democratizes the fundraising process by placing control back to users. If users are intent on winning a particular prize or reward, users can generate content that appeals to a wider audience and receive the most donations through promotion of the published electronic media.

An infrastructure configuration for facilitating fundraising through competing teams of users generating electronic media can include at least one server device and a plurality of client devices. The server device can be further configured to store the user-generated electronic media in a memory (e.g., a database or memory storage device) for providing streaming access thereto. In some instances, the at-least-one-server device can be configured to provide the at-least-one-consumer-client device with user interfaces by providing websites to generate electronic media and facilitate the payment of donations. In some other instances, the server can be configured to interface with applications configured to operate on the client devices, the applications also being configured to generate electronic media and facilitate the donation process.

Turning now to FIG. 1, a schematic depiction is provided illustrating an exemplary system 100 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The exemplary system 100 depicted in FIG. 1 includes a consumer client device 106 that can communicate with a server device 102 over a network 104, such as the Internet. Each of the consumer client device 106 and server device 102 can include a computing device, as described in more detail with respect to FIG. 6.

The exemplary system 100 preferably includes a network 104 that enables communication between at least one server device such as server device 202, and at least one client device such as consumer client device 302. In various embodiments, the network 104 can include one or more networks including, but not limited to, the Internet, WANs, LANs, PANs, telecommunication networks, wireless networks, wired networks, and the like.

A user (e.g., a person using the consumer client device 106) can interact with the server device 102 over network 104 to generate and facilitate campaigns to raise funds for a particular organization using a competitive online platform. It is contemplated that the user can recruit others to partake in the campaigns as a part of a team. The teams allow users to select and organize themselves into groups. The teams provide groups of users that compete to raise funds in support of the campaign. A challenge takes place between competing teams for a campaign and measures the success of a team based on the amount of funds raised. A user can join a challenge by publishing a piece of electronic media, such as a video, picture, or other form of digital media in support of a team. Other users may donate with respect to a previously published piece of electronic media, with the funds also benefitting the associated team and campaign as a whole. In some embodiments, each user, team, and campaign is associated with a value that reflects the cumulative funds raised by each entity. As users donate (or provide commitment values) in support of another user, team, or campaign, the funds-raised values for each entity are accordingly modified. For instance, if a user donates in support of another user's published photograph, that donation amount would be cumulatively added to the user's funds-raised value, along with the funds-raised values of the associated team and campaign. To reflect the competition between teams in a campaign, leaderboards show the ranks of users and teams within a campaign along with ranks of campaigns themselves. Users can interact with these leaderboards and pledge monetary support.

The server device 102 is accessible to several computing devices over the network 104. In this example, the consumer client devices 106 (e.g., PCs, mobile phones, tablets, or any other personal computing device) are operable to communicate with the server device 102 over the network 104. The server device 102 can be configured to provide a user interface to the consumer client devices 106 (e.g., providing a website) or can be configured to interface with a standalone application (e.g., a PC app, web app, mobile app) installed on the consumer client devices 106. In another aspect, the server device 102 can further be in communication with at least one social media platform, for instance, by employing the social media platform API for purposes of accessing previously published electronic media, among other things.

The communications between the aforementioned devices can take place over a network, such as the Internet or a telecommunications network. In embodiments, the server device 102 includes, among other things, a campaign configuration component 108, a team configuration component 110, and a user profile configuration component 112. The campaign configuration component 108, among other things, receives requests to create campaigns, configures campaigns based on the requests (e.g., the organizations supported by the campaigns, length of the campaign), receive information from users related to the campaign, retains a roster of teams competing for the campaign, facilitates challenges between teams, manage the rankings of teams based on the funds raised by each team in a campaign, and maintains the funds-raised values for corresponding campaigns. The team configuration component 110 can, among other things, retain a roster of participating users for each corresponding team, receive details regarding each team (e.g., team name, description of the team), receive information from users related to the team, manage the rankings of users based on the funds raised by each user on a team, and maintain the funds-raised values for each team associated with a campaign. The user profile configuration component 112 can, among other things, receive and publish user-generated electronic media, receive information from users related to the user profiles, facilitate electronic transactions to accept donation payments, and maintain the funds-raised values for each user associated with a team for a campaign. In some embodiments, the server device can store information regarding campaigns, teams, and user profiles to memory 124 (e.g., a memory storage device or database).

The at least one consumer client device 106 can include, among other things, a consumer interfacing component 116, which encompasses a media generating component 118 and leaderboard interfacing component 120, along with a service interfacing component 122. As will be described in more detail herein, in some embodiments, the consumer interfacing component 116 can provide for display a user interface to the consumer for communicating information relevant to facilitating fundraising for the campaign. The consumer interfacing component 116 can also be configured to receive input data provided by the consumer and communicate the input data to the server device 102 by way of the service interfacing component 122. The service interfacing component 122 is configured to communicate with the campaign configuration component 108, the team configuration component 110, and user profile configuration component 112 of the server device 102 through the network 104.

Figure 2:
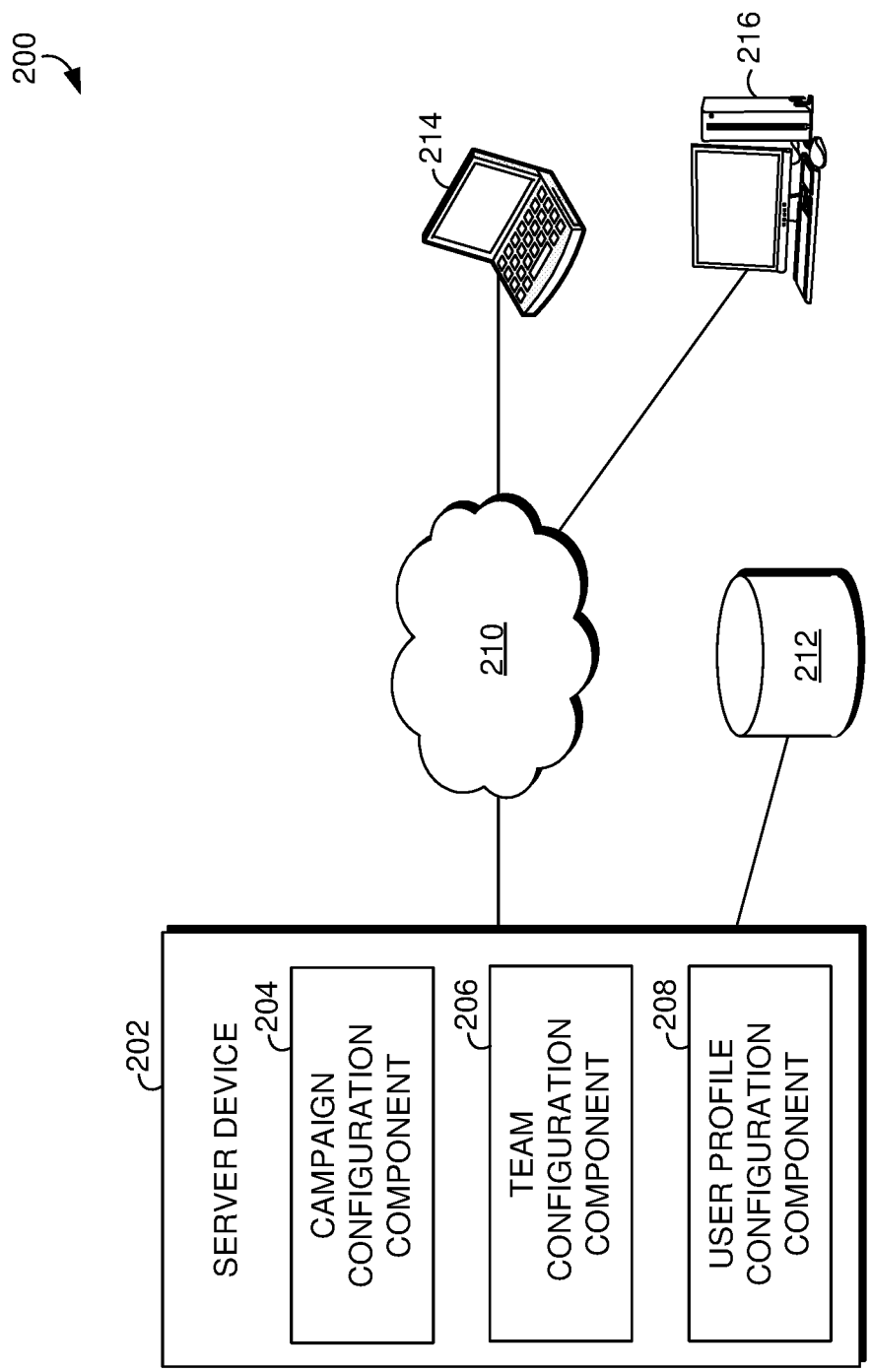
FIG. 2 is a block diagram depicting an exemplary server device in accordance with some embodiments of the present disclosure.

Referring now to FIG. 2, a block diagram 200 is provided depicting an exemplary server device 202 in accordance with some embodiments of the present disclosure. As previously described and in accordance with various embodiments, the server device 202 can comprise one or more computing devices for performing at least some of the functions described herein. The server device 202 can include at least one processor and at least one memory 212 (e.g., a memory storage device or database).

The server device 202 is operable to communicate with other components of the system over a network 210 (e.g., the Internet). The server device 202 can include a campaign configuration component 204 that, among other things, receives requests to create campaigns from consumer client devices 214 and 216, configures campaigns based on the requests (e.g., the organizations supported by the campaigns, length of the campaign), receive information from consumer client devices 214 and 216 related to the campaign, retains a roster of teams competing for the campaign, facilitates challenges between teams, manages the rankings of teams based on the funds raised by each team in a campaign, and maintains the funds-raised values for corresponding campaigns. The server device 202 can also include a team configuration component 206 that, among other things, retains a roster of participating users for each corresponding team, receives details regarding each team (e.g., description of which users should support each team), receives information from users related to the team, manages the rankings of users based on the funds raised by each user on a team, and maintains the funds-raised values for each team associated with a campaign. Additionally, the server device 202 can include a user profile configuration component 208 that, among other things, receives and publishes user-generated electronic media, receives information from users related to the user profiles, facilitates electronic transactions to accept donation payments, and maintains the funds-raised values for each user associated with a team for a campaign.

In some embodiments, the campaign configuration component 204 configures campaigns based on details from a request received from a user. In further embodiments, the user's request is received through a graphical user interface (GUI) as described in FIG. 3 with respect to the consumer interfacing component 304. These campaign details set the parameters for the campaign and are encompassed in a campaign dataset. For instance, the user may send a request to create a campaign that sets forth details regarding the organization being supported by the campaign, the length of the campaign, the goal fundraising amount, the prizes offered for the users or teams that generate the highest donations, and descriptions regarding the purpose behind the campaign. Using these parameters, the campaign dataset is tailored to reflect the specified details of the campaign. Other information received from users related to the campaign may alter these details (and thus the dataset) including extending the length of the campaign or the prizes offered to users generating the top donation amounts. Users may input additional modifications regarding the campaign through a consumer interfacing component 304, described in greater detail in FIG. 3. The campaign details can be provided on a webpage hosted on the server device 202.

In some embodiments, the campaign configuration component 204 retains and manages a roster of all teams associated with a campaign. As a part of the campaign creation request from the user, a set of teams associated with the campaign is provided. These teams are designated to participate in a challenge, where the teams (and any users associated with each team) compete directly to support the campaign. Given further information from users, additional teams may be created and associated with a campaign. Likewise, pre-existing teams may be disassociated from a campaign. In further embodiments, a team may be associated with more than one campaign, with the same roster of users also being associated with another campaign.

Figure 3:
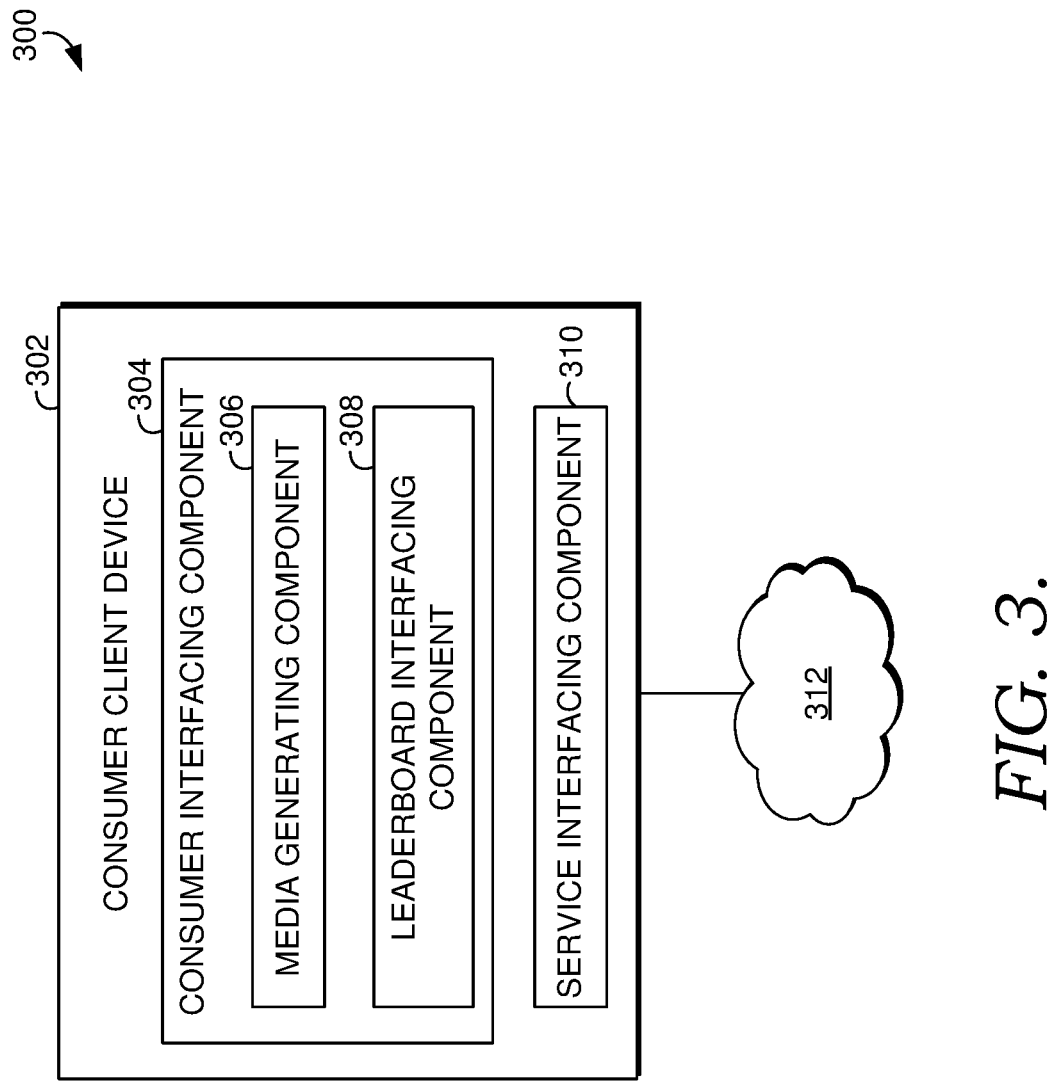
FIG. 3 is a block diagram depicting an exemplary consumer client device in accordance with some embodiments of the present disclosure.

In further embodiments, the campaign configuration component 204 facilitates challenges between the teams by creating a challenge GUI for each team, with the challenge GUI providing details about a team and a leaderboard of its users, as explained in greater detail with respect to the leaderboard interfacing component 308 of FIG. 3. Likewise, the challenge GUI may include specific users without ranking that are associated with a particular team. In some embodiments, the challenge GUI reflects changes to the user and team funds-raised values as donations are provided by users.

In further embodiments, the campaign configuration component 204 maintains funds-raised values for each campaign. The funds-raised values are cumulative values summing the monetary contributions attributed to each user and team. In some embodiments, the cumulative funds-raised value may be associated with each corresponding campaign in a lookup table that can be retrieved for display on consumer client devices 214 and 216 through a GUI. As users provide additional donations to the campaign, regardless of their associated teams, the users' contributions are summed cumulatively into the funds-raised value for the campaign. In some embodiments, a ranking of campaigns is maintained and displayed to the user through a leaderboard GUI on the consumer client devices 214 and 216, as described further in FIG. 3 with respect to the leaderboard interfacing component 308.

In some embodiments, the campaign configuration component 204 also maintains rankings for each team in the campaign. The rankings are based on the funds-raised values for each team, as described in further detail below with respect to the team configuration component 206. As users provide additional donations to a team, the users' donations are summed cumulatively into the funds-raised value for the respective teams. Based on these cumulative funds-raised values for each team, the teams are ranked. Each time a new donation is received, the funds-raised values and rankings are accordingly updated. The ranking of teams for a given campaign may be retrieved for display to the user through a leaderboard GUI on the consumer client devices 214 and 216, as described further in FIG. 3 with respect to the leaderboard interfacing component 308. In some embodiments, the campaign configuration component 204 maintains funds-raised values and ranking for each campaign.

In some embodiments, the team configuration component 206 configures teams based on the details sent by a user in a request. In further embodiments, the user's request is received through a GUI as described in FIG. 3 with respect to the consumer interfacing component 304. The details in the user's request provide the parameters for generation of a team, which are captured in a team dataset. For example, the team dataset may include a team name, a team photo or other electronic media that characterizes the team, a text description, along with a description of team-specific awards or prizes for being a top fundraising user.

In some embodiments, the team configuration component 206 similarly monitors and maintains a roster of associated users with each team. In some embodiments, the team configuration component 206 manages the association of new users and the disassociation of pre-existing users with a team. The team configuration component 206 also maintains funds-raised values of all associated users. The funds-raised values of teams are the cumulative sum of all of the funds-raised values for its associated users. In some embodiments, the cumulative funds-raised value may be associated with each corresponding team in a lookup table that can be retrieved for display on consumer client devices 214 and 216 through a GUI.

In some embodiments, the team configuration component 206 also maintains rankings of all users associated with a team. The ranking of each user is based on the amount of funds generated by the user's piece of electronic media. In further embodiments, a user may generate several pieces of electronic media and the funds-raised values of all of them are cumulatively summed to determine a ranking of that user versus other users. In other words, the user's funds-raised value is aggregated across all pieces of generated media for a campaign that independently raise funds. Similarly, each piece of user-generated media may have a separate funds-raised value and, accordingly, a separate ranking that is tallied and updated. The ranking of users within a given team may be retrieved for display to the user through a leaderboard GUI on the consumer client devices 214 and 216, as described further in FIG. 3 with respect to the leaderboard interfacing component 308.

In some embodiments, the user profile configuration component 208 receives information to configure a user's profile. A user may join the campaign and provide parameters to generate a user profile, which is encapsulated in a user profile dataset. For instance, a user may provide details such as contact information, a photo to associate with the user, a text description, a list of connections with other users, links to the user's accounts on social media, and user-generated media in support of a campaign and/or team. The user-generated electronic media may be a photo, video, audio clip, or other image generated by the user.

In some embodiments, the user profile configuration component 208 generates a profile GUI for each user profile. The profile GUI provides details about a user, such as the user's published electronic media, their selected team, along with the option for other users to donate in support of the user's electronic media. The profile GUI also reflects the profile and team funds-raised values, which are updated as donations are submitted by users.

In some embodiments, a user generates multiple pieces of electronic media in support of one campaign (or several campaigns) that other users may donate towards. In further embodiments, each piece of electronic media generated by a user is published as a separate profile GUI on a separate webpage within a website. The multiple pieces of electronic media may also be aggregated and displayed on a single profile GUI on a webpage attributed to the user. Likewise, a profile GUI showing the user's details along with the user's activity across multiple campaigns may also be displayed as standalone webpage. In further embodiments, the profile GUI includes information regarding the associated team, such as the team name, the team's progress toward a fundraising goal, and the description or electronic media associated with a team.

Similarly, the pieces of electronic media may be published on social media and retrieved for storage to memory 212. In another aspect, the user profile configuration component 208 can further be in communication with at least one social media platform, for instance, by employing the social media platform API for purposes of retrieving previously published media and publishing a link to the campaign page on the user's social media, among other things.

In some embodiments, the user profile configuration component 208 facilitates electronic transactions to accept donation payments from users. As users upload electronic media in support of a team, the user is also prompted to provide a donation amount. Using payment information input by the user, the user profile configuration component 208 processes the donation transaction. In further embodiments, the user profile configuration component 208 processes donation transactions initiated by other users in support of the electronic media. In another aspect, the user profile configuration component 208 can further be in communication with at least one third-party payment platform, for instance, by employing the third-party payment platform API for purposes of using the user's payment credentials to authorize payment to the entity or organization requesting funding, among other things.

With successful processing of the donation transaction, the user profile configuration component 208 recalculates the funds-raised amount associated with user profile to reflect the recent donation. In some embodiments, the user profile configuration component 208 notifies the campaign configuration component 204 and the team configuration component 206 of the recent donation in order to trigger recalculation of the campaign and team funds-raised values.

In some embodiments, the user profile configuration component 208 maintains funds-raised values of all users. To determine a cumulative funds-raised value for a user profile, the funds-raised values associated with each piece of electronic media created by a given user is cumulatively summed. In other words, the user's funds-raised value is aggregated across all pieces of generated media that have independent donation values. Similarly, each piece of user-generated media may have a separate funds-raised value. In some further embodiments, a user may be associated with multiple teams across multiple campaigns. The funds-raised values may be cumulative across all campaigns or maintained separately. In further embodiments, the cumulative funds-raised value may be associated with each corresponding user in a lookup table that can be retrieved for display on consumer client devices 214 and 216 through a GUI.

With reference to FIG. 3, a block diagram 300 is provided depicting an exemplary consumer client device 302 in accordance with some embodiments of the present disclosure. The consumer client device 302 can include at least one computing device described in accordance with FIG. 6, and can further include a consumer interfacing component 304 and a service interfacing component 310. The consumer interfacing component 304 is configured to present for display, data and a user interface to the consumer user, and further receive inputs provided by the consumer. The inputs received by the consumer can be communicated from the service interfacing component 310, through a network 312, to the server device 202 of FIG. 2. The server device 202 can also provide, through the network 312, the service interfacing component 310 with data for presentation to the consumer.

In some embodiments, the consumer interfacing component 304, which includes the media generating component 306 and the leaderboard interfacing component 308, and service interfacing component 310 can be distributed amongst a plurality of consumer client devices 106 (e.g., a mobile computing device, a desktop computing device) of FIG. 1 working together as a paired entity. For instance, a wearable computing device (e.g., smart watch) paired with a computing device (e.g., smart phone or PC) can include the a way of capturing electronic media (e.g., a camera and a microphone) and further include at least a portion of the consumer interfacing component 304, media generating component 306, the leaderboard interfacing component 308, and/or service interfacing component 310. The consumer interfacing component 304 is configured to present for display data and a user interface to the user, and further receive inputs provided by the user. The inputs received by the user can be communicated from the service interfacing component 310, through a network 312, to the server device 202 of FIG. 2. The server device 202 can also provide, through the network 312, the service interfacing component 310 with data for presentation to the user.

In some embodiments, the consumer interfacing component 304 can include various components that, among other things, facilitate generating media from the user. As shown in FIG. 3, the consumer interfacing component 304 includes a media generating component 306. Although not illustrated, the consumer client device 302 includes media generating hardware (e.g., a camera and a microphone) for interfacing with the media generating component 306. The media generating component 306 is configured to instantiate a recording session of photographs, videos, or audio. The consumer client device 302 can receive instructions from the user to fulfill a particular request to capture electronic media by selecting the type of media or a representation thereof and initiating a self-recorded media session via the media generating component 306. Upon instantiation of the recording session, a camera (front-facing or rear-facing) is activated and electronic media is recorded. In some embodiments, the electronic media has been generated by the user previously and can be selected for upload from the consumer client device 302, as illustrated in FIG. 4C. Likewise, the electronic media may be uploaded from social media platforms.

In some embodiments, the consumer interfacing component 304 can include various components that, among other things, provide, for display, leaderboards of campaigns, teams, and users. As shown in FIG. 3, the consumer interfacing component 304 includes a leaderboard interfacing component 308. The leaderboard interfacing component 308 retrieves rankings of campaigns, teams, and users from the server device 202 through network 312 using the service interfacing component 310. Depending on the user's selection of a leaderboard to view, different leaderboards are generated and provided for display. In further embodiments, to provide for displaying a campaign leaderboard, the leaderboard interfacing component 308 retrieves rankings of campaigns from the campaign configuration component 204 of server device 202 through network 312 using the service interfacing component 310. Likewise, to generate a leaderboard for teams and users based on rankings, the leaderboard interfacing component 308 retrieves rankings of teams and users from the campaign configuration component 204 and team configuration component 206, respectively.

In further embodiments, the leaderboard interfacing component 308 receives data for presentation to the user regarding leaderboards from the server device 202 through service interfacing component 310 over a network 312. The teams on a leaderboard may be represented to the user through a GUI with each team ordered based on the relative ranking of each team. For example, a team with a higher funds-raised value has a higher ranking than those teams with a lower fund-raised value. As a result, the higher-ranked team may be displayed higher up on the display than the lower-ranked teams. Likewise, each team may be sized proportionally according to the funds-raised value of each team, as shown by the teams 406A of FIG. 4A, where teams with a higher funds-raised value are larger than those with a lower funds-raised value. These teams may be dynamically resized as additional donations come through and the funds-raised values change.

Figure 4A:
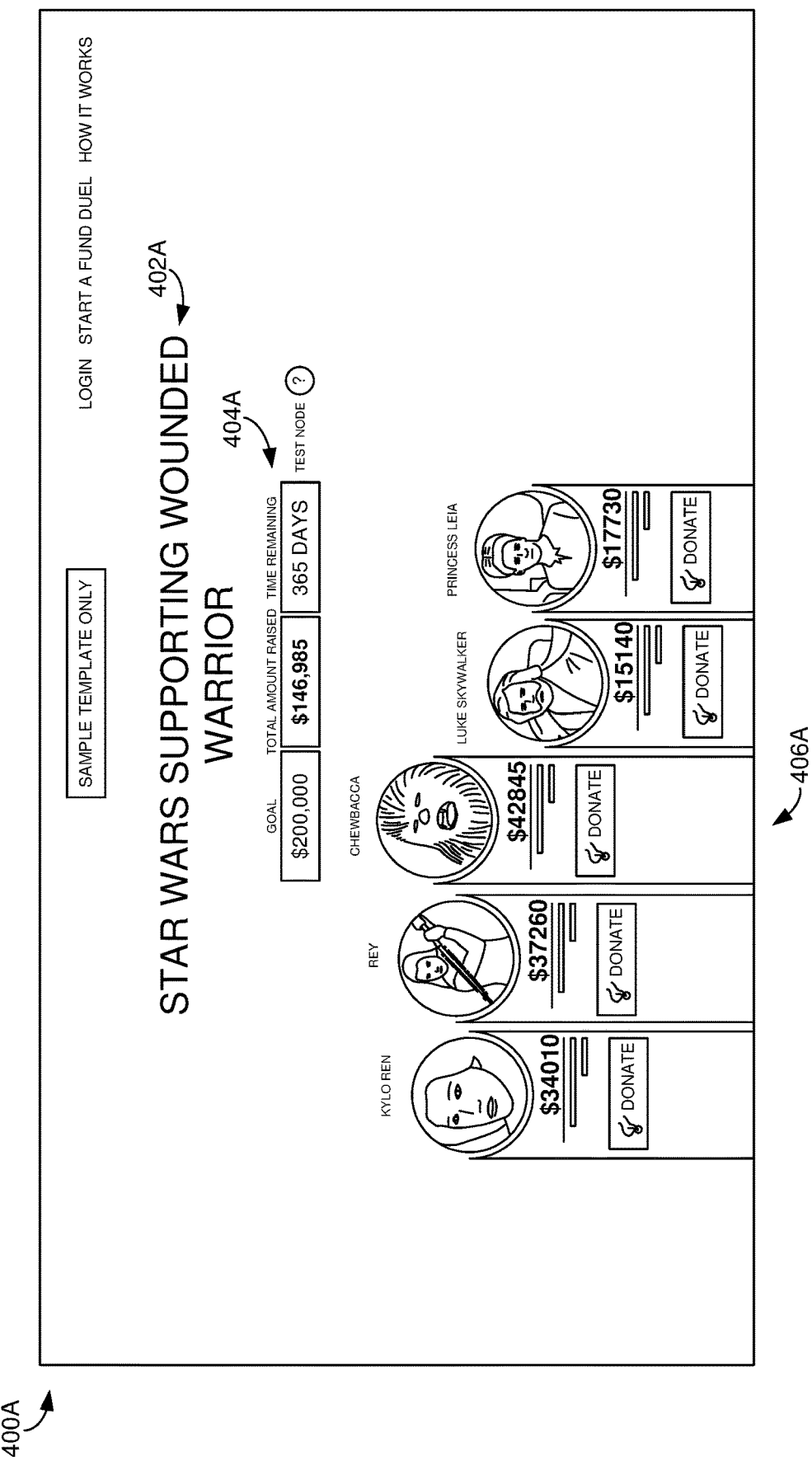
FIGS. 4A-4G are exemplary screenshots illustrating user interfaces provided for display on an exemplary consumer client device in accordance with some embodiments of the present disclosure.
Figure 4B:
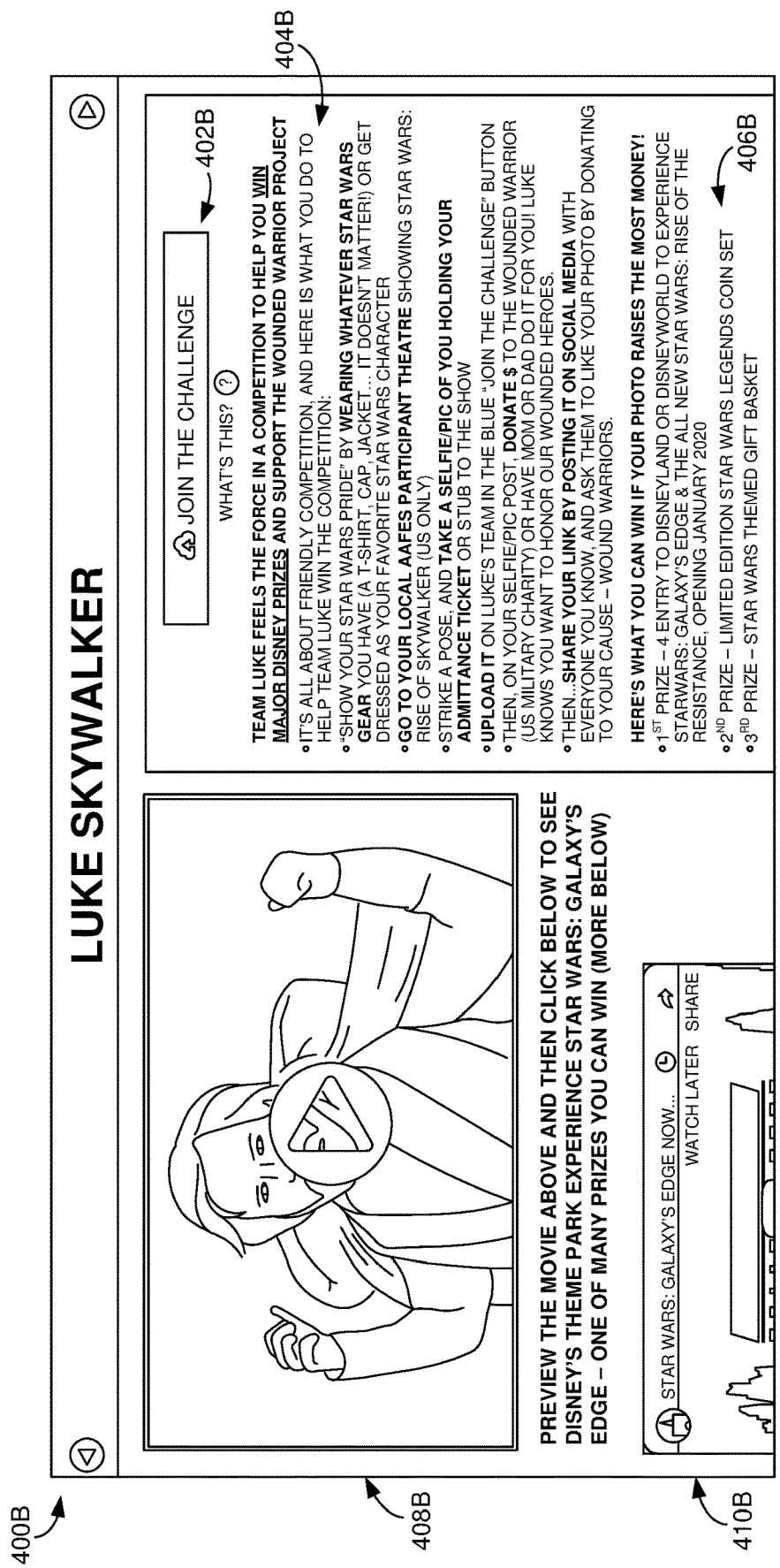
Figure 4C:
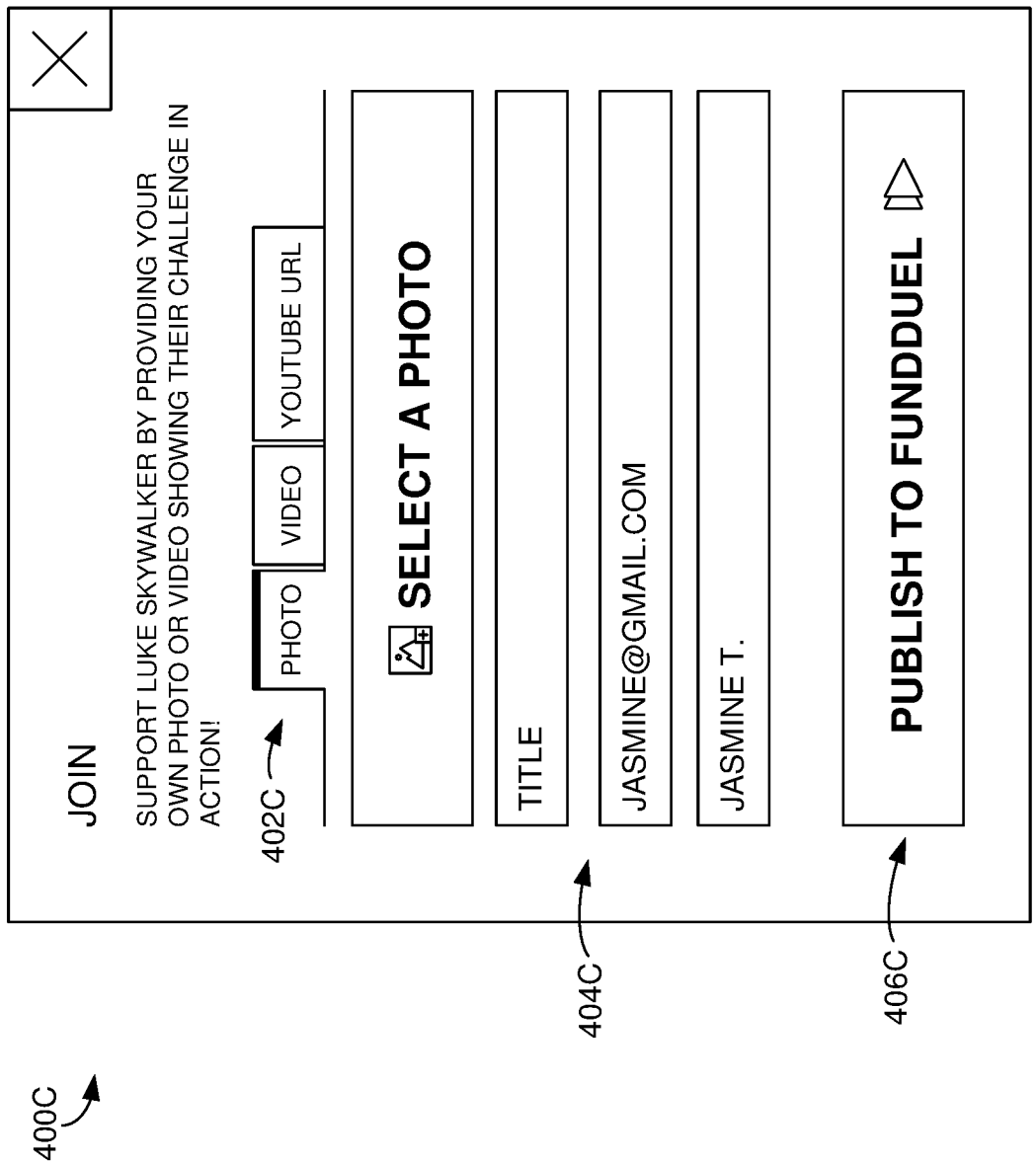
Figure 4D:
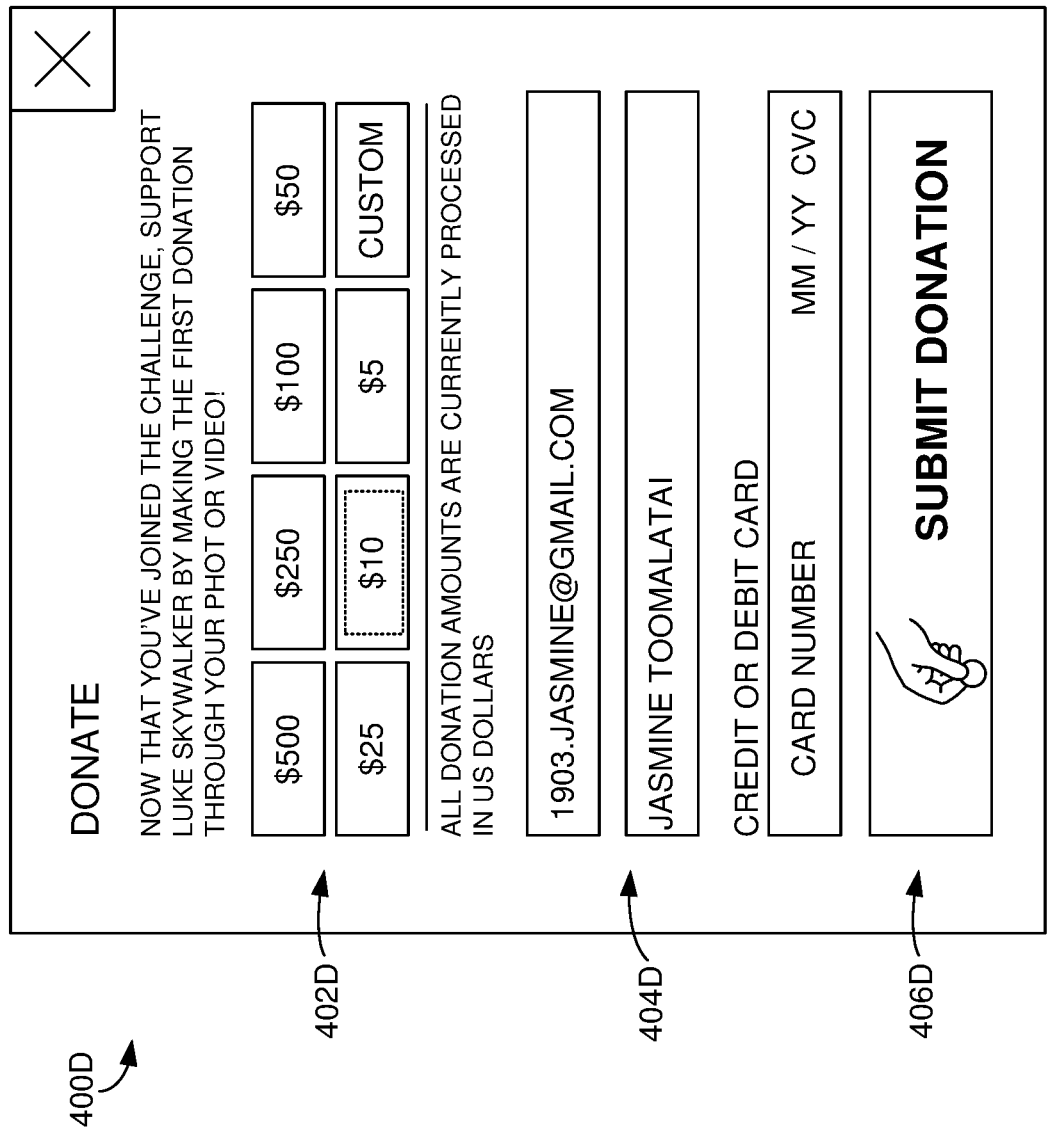
Figure 4E:
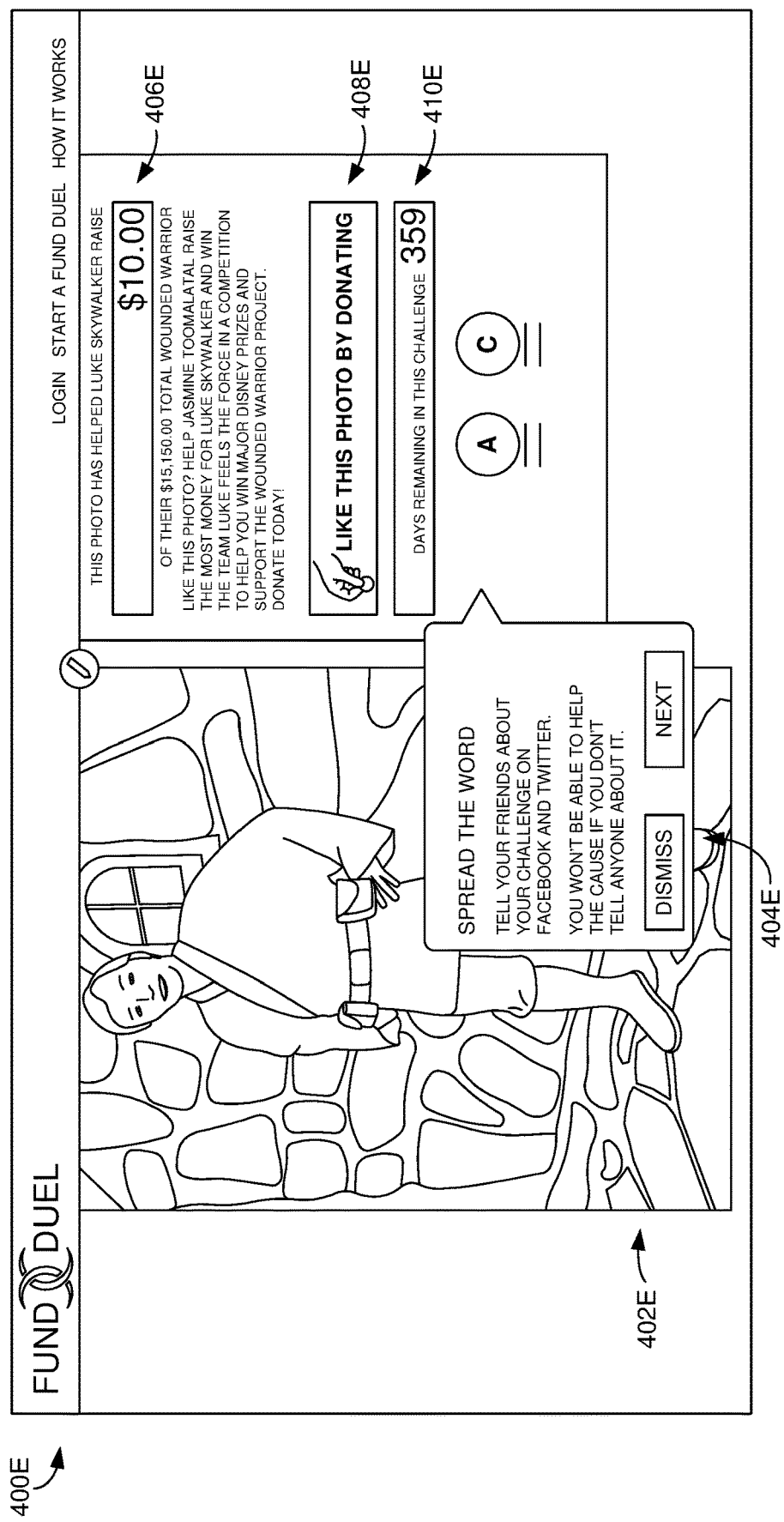
Figure 4F:
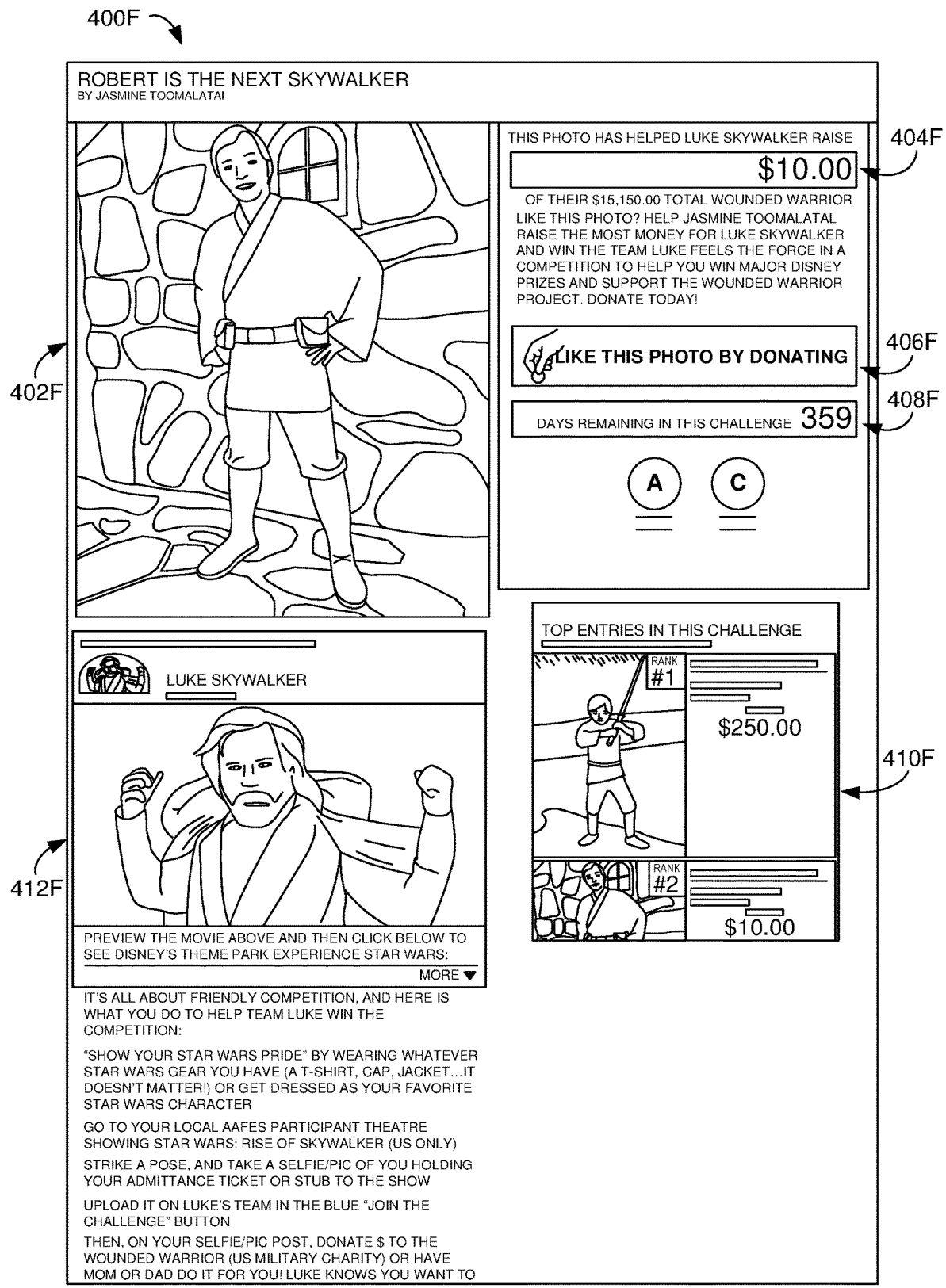
Figure 4G:
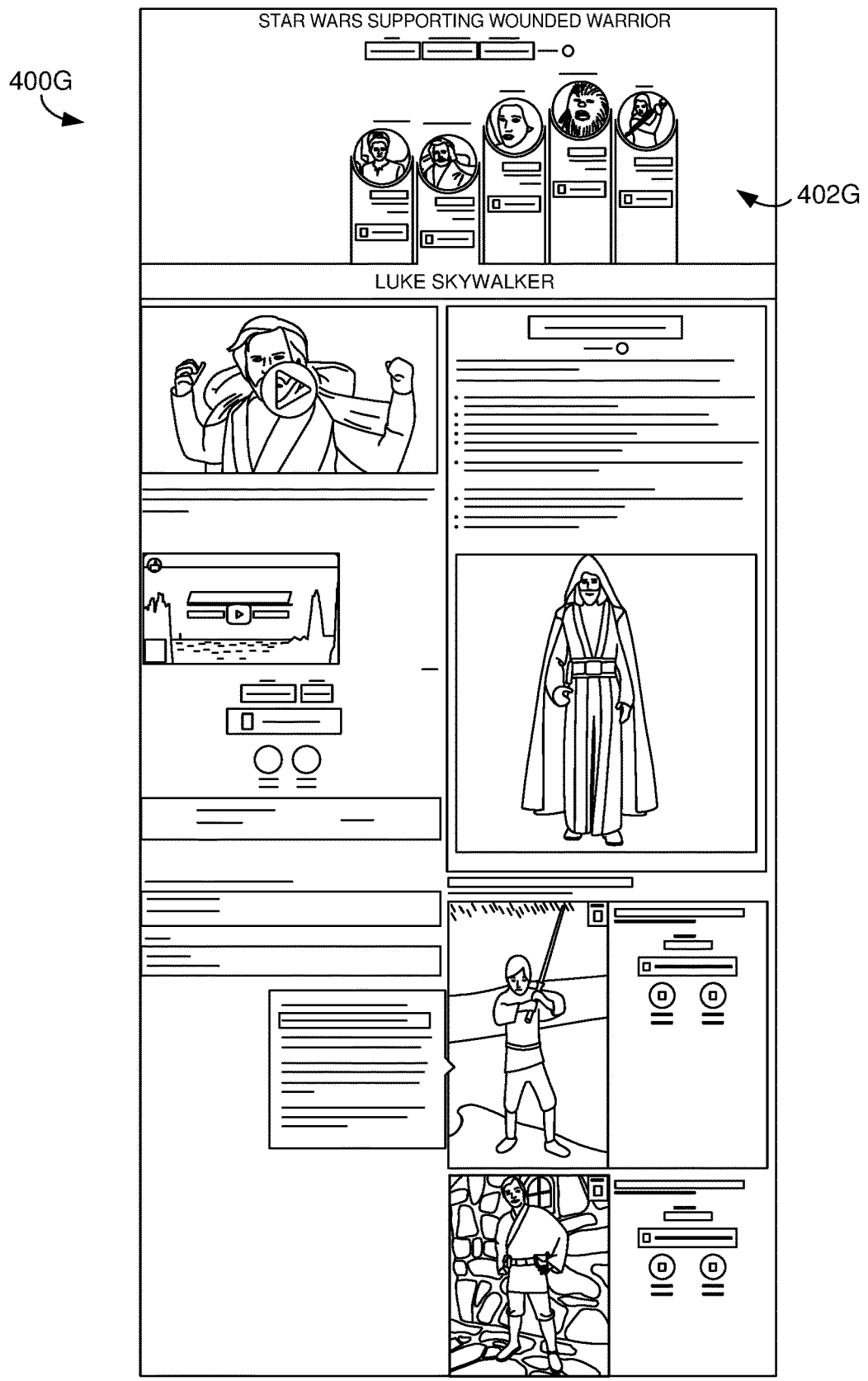

In some embodiments, the teams are presented in a random order to prevent first-view bias by users, as shown by the teams 406A in FIG. 4A and 402G in FIG. 4G, where teams are randomly ordered, without regard to the ranking of each team. The same applies to leaderboards for campaigns and users. In some embodiments, for leaderboards of users, each team may have its own leaderboard for its associated users. In some embodiments, leaderboards of users can rank users based on all pieces of electronic media they have published across all campaigns. Similarly, leaderboards of users can rank users (or their standalone pieces of electronic media) in a campaign across all teams in a campaign. In further embodiments, these rankings may be used to determine which user(s) or team(s) receive pre-disclosed prizes based on the highest amount of funds raised.

As donations (or commitment values) from users are provided, the funds-raised values of each entity (i.e. campaigns, teams, and users) are modified. Likewise, the ranking of each entity (i.e. campaigns, teams, and users) is similarly modified, as described with respect to the campaign configuration component 204, team configuration component 206, and user profile configuration component 208 in FIG. 2. The leaderboard GUI (and any elements therein) is dynamically changed to reflect the changing funs-raised values and ranks for teams.

The server device 202 of FIG. 2 is configured to accept commitment values or donations paired with user-generated electronic media and provide leaderboards ranking campaigns, teams, and users to engage users in fundraising. The listing of campaigns and/or teams on the webpage or application provided on a consumer client device 302 is operable to provide campaigns, teams, and electronic media published by users that other users can support through donations. In essence, any consumer can navigate to a campaign page and determine whether to support a particular team. Once the consumer has selected a team to support, the consumer is prompted to provide a piece of electronic media coupled with a donation or commitment amount.

An exemplary GUI on the consumer client device 302 is illustrated in FIGS. 4A-4G, which provides the consumer's experience of publishing a piece of electronic media in support of a team on a campaign. FIG. 4A illustrates, for example, an initial campaign page 400A that presents a consumer with the details regarding the campaign such as the campaign name 402A, along with the fundraising goal, funds raised, and time left in the campaign, as cumulatively shown by 404A. The initial campaign page 400A also shows teams 406A (e.g., Kylo Ren, Rey, Chewbacca, Luke Skywalker, Princess Leia) associated with a campaign the consumer is interested in. As illustrated in FIG. 4A, the teams are organized in random order (not by the amount of funds raised) to prevent first-view bias. Likewise, each team is sized in height proportional to the amount of funds raised. From the initial campaign page 400A, the consumer can select a team to support and navigate to the team page 400B for Luke Skywalker in FIG. 4B. The team page 400B, as illustrated in FIG. 4B, provides a button 402B for the user to join the challenge in support of Luke Skywalker team, text description of the team's coordinated themed electronic media 404B, prizes 406B available for the consumer's electronic media that generates the most funds, a video associated with the team 408B, along with a video 410B providing greater details about the prizes 406B.

If a consumer chooses to join the challenge, the consumer is tasked with providing a piece of electronic media such as a photo, video, or link to a video 402C for upload, as illustrated in the media upload page 400C of FIG. 4C. The consumer is also requested to provide contact information 404C and confirm publishing of the electronic media by selecting a button 406C. In addition, the consumer is prompted to provide a commitment value (or donation) 402D, enter payment information 404D, and confirm payment through a "submit donation" button 406D as illustrated in the donation page 400D of FIG. 4D. Upon receipt of confirmation of payment, through the selection provided by a consumer on the consumer client device 302, the server device 202 of FIG. 2 can be configured to also process an electronic transaction using payment information to facilitate transfer of the consumer's donation.

By confirming publishing of the electronic media and processing of the donation payment, the consumer's uploaded electronic media is published on a webpage in support of the campaign. In other words, the consumer provides a piece of electronic media associated with a team in the campaign that other consumers may donate in support of. The user profile page 400E, as illustrated in FIG. 4E, is a standalone page that includes consumer's uploaded electronic media 402E, a notification to publicize the electronic media 404E, total funds 406E raised by the consumer's uploaded electronic media, and details about the campaign (e.g., days left in the challenge) 410E. The user profile page 400E similarly includes a donation button 408E for other users to submit donations in support of the electronic media. User profile page 400F of FIG. 4F, provides similar detail as FIG. 4E with the user's published electronic media 402F, funds-raised amount 404F, donation button 406F, and the campaign length 408F, along with a leaderboard of top-earning electronic media entries in the challenge (spanning all teams) 410F and a video describing the team 412F.

As other consumers donate in support of another consumer's publish electronic media, the funds-raised values for the campaign, teams, and users (along with corresponding rankings) are accordingly modified. Once the funds-raised values are updated, the server device 202 of FIG. 2 can be configured to provide updated details to generate a leaderboard ranking the teams and users (and/or their electronic media) associated with a campaign. The updated campaign page 400G of FIG. 4G includes a rearranged set of teams associated with the campaign, with the teams organized in a different, random order compared to the arrangement in FIG. 4A in order to similarly inhibit first-view bias. Likewise, the heights of each team's representations are dynamically resized to reflect the new funds-raised amounts. The updated campaign page 400G, which the user interacted with to select the Luke Skywalker team, also illustrates additional information about that team.

Figure 5:
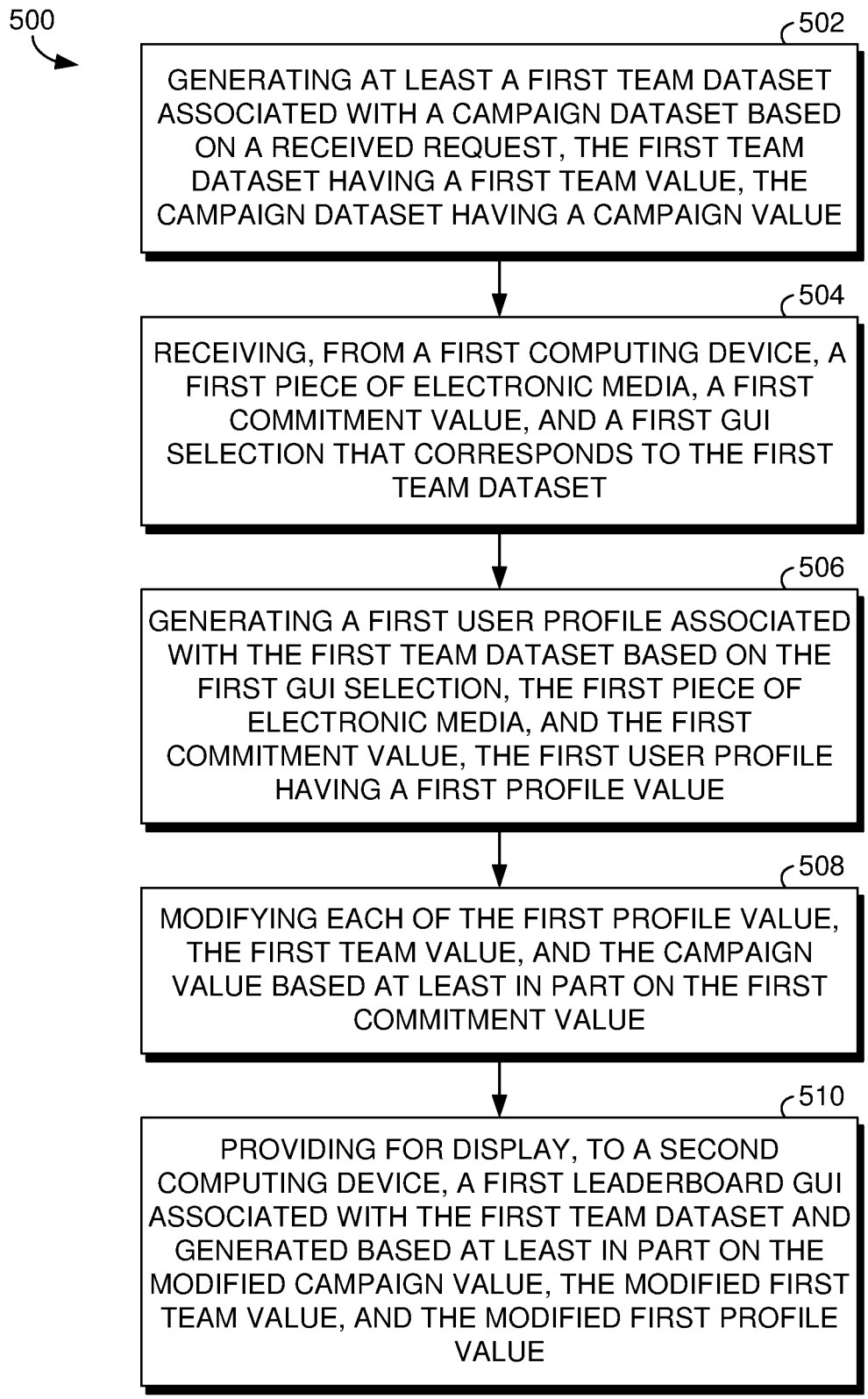
FIG. 5 is a flow diagram showing an exemplary method for facilitating a campaign using a competitive online platform in accordance with some embodiments of the present disclosure.

Turning now to FIG. 5, a flow diagram 500 is provided that illustrates a method for facilitating a fundraising campaign using a competitive online platform operating on campaign, team, and user profile datasets. As described in accordance with FIG. 2, a computing device, such as server device 202 of FIG. 2 and server device 102 of FIG. 1, can obtain details regarding a request to create a fundraising campaign and associated teams from consumer client devices 106 of FIG. 1 and 302 of FIG. 3. At step 502, a first team dataset that is associated with a campaign dataset is generated based on details from the user's request. Each team dataset includes a team value, corresponding to the funds raised cumulatively by all users associated with the team. In some embodiments, a user may specify more than one team to be associated with a campaign, with each team having a team dataset. Likewise, each campaign dataset includes a campaign value, corresponding to the funds raised cumulatively by all teams associated with the campaign. Parsing through the details from the user's request, the team dataset is populated with details such as the team name, a team photo, as described above with respect to the team configuration component 206 of FIG. 2. Likewise, the campaign dataset is similarly populated with details from the user's request, as described above with respect to the campaign configuration component 204 of FIG. 2. In some embodiments, the server device 202 of FIG. 2 and server device 102 of FIG. 1 can store the team and campaign datasets to a memory, such as memory 124 (e.g., a memory storage device or database) of FIG. 1.

At step 504, a piece of electronic media, a commitment value, and a GUI selection corresponding to the team dataset is received. When a user decides to join a challenge for a campaign, as described above, a user selects a team associated with a campaign. The user's selection occurs using a GUI, as illustrated and described with respect to FIG. 4A. A user is tasked with providing a piece of electronic media (to publish and encourage donations from other users) and provide a commitment value regarding the amount of money the user is donating in support of the selected team.

At step 506, a user profile associated with the team dataset based on the GUI selection, the piece of electronic media, and the commitment value is generated. Each user profile has a profile value corresponding to the funds raised by the user's published electronic media. The user profile is similarly populated with details from the user, as described above with respect to the user profile configuration component 208 of FIG. 2. In some embodiments, payment information to facilitate the monetary donation in the amount of the commitment value is received from the user. In some embodiments, a user submits several pieces of electronic media for a campaign or across several campaigns. In further embodiments, the user's multiple submissions are aggregated into one user profile. Likewise, the user's multiple submissions of electronic media may be represented by multiple user profiles. In some embodiments, the server device can store the user profile associated with a team to a memory, such as memory 124 (e.g., a memory storage device or database) of FIG. 1.

At step 508, the profile value, team value, and campaign value are modified based on the commitment value. Based on the commitment value, the corresponding values for each entity (e.g., campaign, team, and user profile) are accordingly changed. For example, before a user donates, the campaign value may be $1,000 and the team value of $500. If the user donates in the amount of $200, and the campaign value would increase to $1,200 and the team value would increase to $700. Likewise, the profile value would be $200. As other users contribute with respect to the user's generated electronic media, the campaign, team, and profile values would increase. For instance, if another user donated $300 in support of the aforementioned user profile (i.e., the user's uploaded electronic media), the profile value would increase to $500, with the team value going up to $1,000 and the campaign value increasing to $1,500.

In some embodiments, a profile GUI associated with a team dataset is generated based in part on the user profile and the modified profile and team values. The profile GUI provides an interface for other users to donate with respect to a user's published electronic media, as shown in FIGS. 4E and 4F, and explained in greater detail with respect to the user profile configuration component 208 of FIG. 2. The profile GUI reflects the user's details, such as the published electronic media, along with the funds-raised values for the user and team. Likewise, a challenge GUI associated with a team may be generated showcasing the competing teams along with an associated user's profile GUI, as shown in FIG. 4G and explained in greater detail with respect to campaign configuration component 204 of FIG. 2. In further embodiments, the challenge GUI may only represent a single team and associated users.

At step 510, a leaderboard GUI associated with the selected team and generated based on the modified campaign, team and profile values, is provided for display to a second computing device. A leaderboard GUI is generated using the modified campaign, team, and profile values, as described in detail above with respect to the leaderboard interfacing component 308 of FIG. 3. In some embodiments, each team dataset may have an associated leaderboard generated. The leaderboard GUI is presented for display to another computing device and is dynamically updated as additional donations from users come through and the profile, team, and campaign values are modified.

Figure 6:
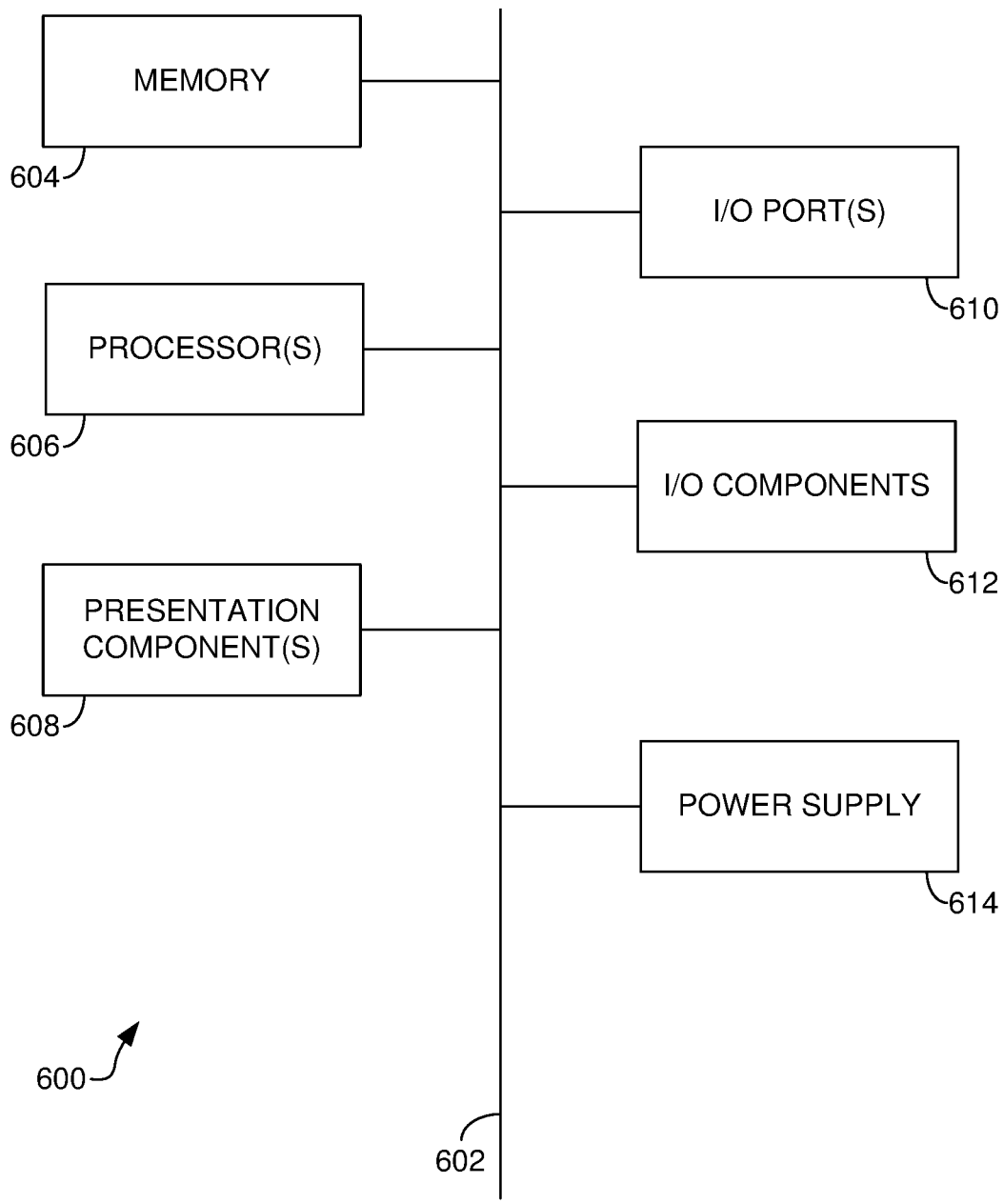
FIG. 6 is a block diagram of an exemplary computing environment suitable for use in implementing some embodiments of the present disclosure.

Having described embodiments of the present disclosure, an exemplary operating environment in which embodiments of the present disclosure may be implemented is described below in order to provide a general context for various aspects of the present disclosure. Referring initially to FIG. 6 in particular, an exemplary operating environment for implementing embodiments of the present disclosure is shown and designated generally as computing device 600. Computing device 600 is but one example of a suitable computing environment and is not intended to suggest any limitation as to the scope of use or functionality of the described embodiments. Neither should the computing device 600 be interpreted as having any dependency or requirement relating to any one or combination of components illustrated.

The various embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The various embodiments may be practiced in a variety of system configurations, including hand-held devices, consumer electronics, general-purpose computers, more specialty computing devices, etc. The various embodiments may also be practiced in distributed computing environments where tasks are performed by remote-processing devices that are linked through a communications network.

With reference to FIG. 6, computing device 600 includes a bus 602 that directly or indirectly couples the following devices: memory 604, one or more processors 606, one or more presentation components 608, input/output (I/O) ports 610, input/output components 612, and an illustrative power supply 614. Bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 604 or I/O components 612. Presentation component(s) 608 present data indications to a user or other device. Exemplary presentation components include a display device, speaker, printing component, vibrating component, etc.

I/O ports 610 allow computing device 600 to be logically coupled to other devices including I/O components 612, some of which may be built in. Illustrative components include a microphone, joystick, game pad, satellite dish, scanner, printer, wireless device, etc. The I/O components 612 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present disclosure provide for, among other things, tracking the provenance of collected machine or agronomic worked data (i.e., farming data) to provide secured access to authorized user accounts, provide auditability of the collected worked data, and also enable transactional oversight of the collected worked data exchanged between authorized user accounts. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that the described embodiments are one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter described in the present disclosure is provided with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer storage medium storing computer-useable instructions that, when used by one or more computing devices, cause the one or more computing devices to perform operations comprising:

generating a plurality of team datasets associated with a campaign dataset, each team dataset of the plurality of team datasets having a corresponding team value, the campaign dataset having a campaign value;

receiving, from a first computing device, a first piece of electronic media, a first commitment value, and a first graphical user interface (GUI) selection that corresponds to a first team dataset of the plurality of team datasets;

generating a first user profile associated with the first team dataset based on the first GUI selection, the first piece of electronic media, and the first commitment value, the first user profile having a first profile value;

modifying each of the first profile value, the first team value, and the campaign value based at least in part on the first commitment value;

causing a second computing device to display a plurality of dynamic graphical elements within a GUI of the second computing device, each of the plurality of dynamic graphical elements corresponding to one of the plurality of team datasets and having a display height defined based on the corresponding team value, the plurality of dynamic graphical elements being ordered randomly and not based on the corresponding team values, wherein the plurality of dynamic graphical elements includes a first dynamic graphical element associated with the first team dataset and having the display height defined by the modified first team value, and causing a modification of the GUI to include presentation of at least the first piece of electronic media associated with the first team dataset based on an interaction with the first dynamic graphical element.

2. The medium of claim 1, the operations further comprising:
  generating a first profile GUI associated with the first team dataset based at least in part on the generated first user profile, the modified first profile value, and the modified first team value.

3. The medium of claim 2, the operations further comprising:
  generating a first challenge GUI associated with the first team dataset, the generated first challenge GUI presenting at least the generated first profile GUI associated with the first team dataset.

4. A computer-implemented method for facilitating fundraising campaigns, the method comprising:
  generating a plurality of team datasets associated with a campaign dataset, each team dataset of the plurality of team datasets having a corresponding team value, the campaign dataset having a campaign value;
  receiving, from a first computing device, a first piece of electronic media, a first commitment value, and a first graphical user interface (GUI) selection that corresponds to a first team dataset of the plurality of team datasets;
  generating a first user profile associated with the first team dataset based on the first GUI selection, the first piece of electronic media, and the first commitment value, the first user profile having a first profile value;
  modifying each of the first profile value, the first team value, and the campaign value based at least in part on the first commitment value;
  causing a second computing device to display a plurality of dynamic graphical elements within a GUI of the second computing device, each of the plurality of dynamic graphical elements corresponding to one of the plurality of team datasets and having a display height defined based on the corresponding team value, the plurality of dynamic graphical elements being ordered randomly and not based on the corresponding team values, wherein the plurality of dynamic graphical elements includes a first dynamic graphical element associated with the first team dataset and having the display height defined by the modified first team value, and
  causing a modification of the GUI to include presentation of at least the first piece of electronic media associated with the first team dataset based on an interaction with the first dynamic graphical element.

5. The computer-implemented method of claim 4, the method further comprising:
  generating a first profile GUI associated with the first team dataset based at least in part on the generated first user profile, the modified first profile value, and the modified first team value.

6. The computer-implemented method of claim 5, the method further comprising:
  generating a first challenge GUI associated with the first team dataset, the generated first challenge GUI presenting at least the generated first profile GUI associated with the first team dataset.

7. A system comprising:
  one or more hardware processors; and
  a machine-readable hardware storage device coupled with the one or more hardware processors, the machine-readable hardware storage device storing instructions that, when executed by the one or more processors, cause the system to perform operations comprising:
  generating a plurality of team datasets associated with a campaign dataset, each team dataset of the plurality of team datasets having a corresponding team value, the campaign dataset having a campaign value;
  receiving, from a first computing device, a first piece of electronic media, a first commitment value, and a first graphical user interface (GUI) selection that corresponds to a first team dataset of the plurality of team datasets;
  generating a first user profile associated with the first team dataset based on the first GUI selection, the first piece of electronic media, and the first commitment value, the first user profile having a first profile value;
  modifying each of the first profile value, the first team value, and the campaign value based at least in part on the first commitment value;
  causing a second computing device, a plurality of dynamic graphical elements within a GUI of the second computing device, each of the plurality of dynamic graphical elements corresponding to one of the plurality of team datasets and having a display height defined based on the corresponding team value, the plurality of dynamic graphical elements being ordered randomly and not based on the corresponding team values, wherein the plurality of dynamic graphical elements includes a first dynamic graphical element associated with the first team dataset and having the display height defined by the modified first team value, and
  causing a modification of the GUI to include presentation of at least the first piece of electronic media associated with the first team dataset based on an interaction with the first dynamic graphical element.

8. The system of claim 7, wherein the display height of each dynamic graphical element of the plurality of dynamic graphical elements are dynamically sized based on modifications of the team value associated with the team dataset of the plurality of team datasets.

9. The system of claim 7, the operations further comprising:
  generating a first profile GUI associated with the first team dataset based at least in part on the generated first user profile, the modified first profile value, and the modified first team value.

10. The system of claim 9, the operations further comprising:
  generating a first challenge GUI associated with the first team dataset, the generated first challenge GUI presenting at least the generated first profile GUI associated with the first team dataset.

* * * * *